US011875726B2

(12) United States Patent
Shen et al.

(10) Patent No.: US 11,875,726 B2
(45) Date of Patent: Jan. 16, 2024

(54) DRIVE CIRCUIT FOR DISPLAY PANEL AND DISPLAY DEVICE

(71) Applicant: HKC CORPORATION LIMITED, Guangdong (CN)

(72) Inventors: Tingting Shen, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/256,715

(22) PCT Filed: Jun. 30, 2022

(86) PCT No.: PCT/CN2022/103022
§ 371 (c)(1),
(2) Date: Jun. 9, 2023

(87) PCT Pub. No.: WO2023/005592
PCT Pub. Date: Feb. 2, 2023

(65) Prior Publication Data

US 2023/0401991 A1 Dec. 14, 2023

(30) Foreign Application Priority Data

Jul. 30, 2021 (CN) ........................ 202110874017.X

(51) Int. Cl.
*G09G 3/20* (2006.01)

(52) U.S. Cl.
CPC ... *G09G 3/2092* (2013.01); *G09G 2310/0267* (2013.01); *G09G 2310/0275* (2013.01);
(Continued)

(58) Field of Classification Search
None
See application file for complete search history.

(56) References Cited

U.S. PATENT DOCUMENTS 7,126,595 B2 * 10/2006 Yanagi .................. H02M 3/073 349/39
11,114,004 B2 * 9/2021 Li ............................ G09G 3/20
(Continued)

FOREIGN PATENT DOCUMENTS

CN 104810004 A 7/2015
CN 105405406 A 3/2016
(Continued)

OTHER PUBLICATIONS

International Search Report dated Sep. 7, 2022, in corresponding International Application No. PCT/CN2022/103022, 4 pages.
(Continued)

*Primary Examiner* — Sepehr Azari
(74) *Attorney, Agent, or Firm* — Maier & Maier, PLLC

(57) ABSTRACT

A drive circuit for a display panel, including a generation module, an output module and a switch control module. The output module is in electric connection with the generation module and the switch control module. The output module is configured to output a generation signal to a gate driver according to a switch control signal. The output module is further configured to output a first clock signal and a second clock signal to the gate driver according to the switch control signal. The refresh rate of the display panel can be changed in real time, and the power consumption of the display panel having high refresh rate is reduced; meanwhile, the signals outputted by the output module can be continuous, so as to improve the display effect of the display panel and prolong the service life of the display panel.

14 Claims, 10 Drawing Sheets

(52) U.S. Cl.
CPC ............... *G09G 2320/0247* (2013.01); *G09G 2330/021* (2013.01)

(56) References Cited

U.S. PATENT DOCUMENTS

| | | | | |
|---|---|---|---|---|
| 2002/0036636 | A1* | 3/2002 | Yanagi | H02M 3/073 345/92 |
| 2002/0093497 | A1* | 7/2002 | Kakumoto | G09G 3/3674 345/204 |
| 2014/0225817 | A1 | 8/2014 | Huang et al. | |
| 2018/0158418 | A1 | 6/2018 | Ryu et al. | |
| 2019/0005866 | A1* | 1/2019 | Li | G09G 3/3266 |
| 2019/0130806 | A1* | 5/2019 | Li | G09G 3/3674 |
| 2021/0225227 | A1* | 7/2021 | Li | G09G 3/20 |

FOREIGN PATENT DOCUMENTS

| | | | |
|---|---|---|---|
| CN | 106205461 | A | 12/2016 |
| CN | 106251804 | A | 12/2016 |
| CN | 106710561 | A | 5/2017 |
| CN | 207781163 | U | 8/2018 |
| CN | 109410894 | A | 3/2019 |
| CN | 109830204 | A | 5/2019 |
| CN | 113570996 | A | 10/2021 |
| KR | 20150055653 | A | 5/2015 |

OTHER PUBLICATIONS

Written Opinion dated Sep. 7, 2022, in corresponding International Application No. PCT/CN2022/103022, 8 6 pages.

Office Action dated Feb. 16, 2022, in corresponding Chinese Application No. 202110874017.X, 13 pages.

Notification to Grant Patent Right for Invention dated Mar. 30, 2022, in corresponding Chinese Application No. 202110874017.X, 6 pages.

* cited by examiner

DRIVE CIRCUIT FOR DISPLAY PANEL AND DISPLAY DEVICE

CROSS-REFERENCE TO RELATED APPLICATIONS

This application is the U.S. national phase of International Application No. PCT/CN2022/103022 with an international filing date of Jun. 30, 2022, designating the U.S., now pending, and claims the priority of Chinese patent application number 202110874017. X filed with the China Patent Office on Jul. 30, 2021 and titled "DRIVE CIRCUIT FOR DISPLAY PANEL AND DISPLAY DEVICE", the entire contents of which are incorporated in this application by reference.

TECHNICAL FIELD

The present application relates to the field of display technology, and more particularly to a drive circuit for a display panel and a display device.

BACKGROUND

With the rapid development of display technology, display panels are widely used in various fields, such as entertainment, education, and security, and users have gradually increased requirements for display effects of display panels. Refresh rate (also called Frames Per Second, FPS) is an important index to measure the display effect of the display panel. The refresh rate determines the number of frames transmitted per second. The higher the refresh rate, the shorter the time interval of each frame, which can improve clarity and fluency of the display screen, and in turn effectively improve the display effect.

At present, display panels having a high refresh rate have been widely applied in mid-to-high-end markets, but display panels having the high refresh rate consume relatively high power consumption. It has become an urgent problem to be solved how to reduce the power consumption of the display panels having the high refresh rate.

SUMMARY

It is one of the objectives of the embodiments of the present application to provide a drive circuit for a display panel and a display device, aiming at solving the problem of high power consumption of the existing display panel having a high refresh rate.

Embodiments of the present application adopt the following technical solutions:

In a first aspect, a drive circuit for a display panel is provided. The driver circuit comprises: a generation module, a switch control module, and an output module;

the output module is in electric connection with the generation module and the switch control module respectively;

the generation module is configured to receive a first clock signal, a second clock signal, a first control signal, and a second control signal, and process the first clock signal and the second clock signal according to the first control signal and the second control signal to obtain a generated signal, and output the generated signal to the output module, wherein the first clock signal and the second clock signal have a preset phase difference;

the switch control module is configured to output a switch control signal to the output module according to the received first level signal, second level signal, and third control signal; and the output module is configured to output, when the third control signal is at a low level, the generated signal to a gate driver according to the switch control signal; and the output module is further configured to output, when the third control signal is at a high level, the first clock signal or the second clock signal to the gate driver according to the switch control signal.

In a second aspect, a display device is provided. The display device comprises: a display panel, a control unit, a source driver, and a gate driver;

the display panel is in connection with the source driver and the gate driver, respectively, and the control unit is in connection with the source driver and the gate driver, respectively;

the control unit comprises the drive circuit according to the above first aspect; and the drive circuit of the control unit is in connection with the gate driver.

The drive circuit for a display panel provided by first aspect of embodiments of the present application includes: a generation module, an output module, and a switch control module. The output module is in electric connection with the generation module and the switch control module. The output module is configured to output a generated signal to the gate driver according to the switch control signal. The output module is further configured to output the first clock signal and the second clock signal to the gate driver according to the switch control signal. In this way, the refresh rate of the display panel can be changed in real time and the power consumption of the display panel having high refresh rate can be reduced, meanwhile, the output signal of the output module can be continuous without interruption, thereby improving the display effect of the display panel and prolonging the service life of the display panel.

It can be understood that, for the beneficial effects of the second aspect, reference may be made to the relevant description in the first aspect in the above, and details are not repeated here.

DETAILED DESCRIPTION OF THE EMBODIMENTS

Embodiments of the present application provide a drive circuit for a display panel, which can be applied to a display panel. The driver circuit is able to change the refresh rate of the display panel in real time, which enables the display panel to switch between a high refresh rate and a low refresh rate while ensuring the display effect, so as to decrease the power consumption of the display panel having a high refresh rate and prolong the service life of the display panel.

In application, the display panel can be based on liquid crystal display panel adopting the thin film transistor liquid crystal display (TFT-LCD) technology, the liquid crystal display panel adopting the liquid crystal display (LCD) technology, organic electro-laser display panels adopting the organic light-emitting diode (OLED) technology, and quantum dot light-emitting diode display panel or curved display panel adopting the quantum dot light-emitting diode (QLED), and the like.

Figure 1:
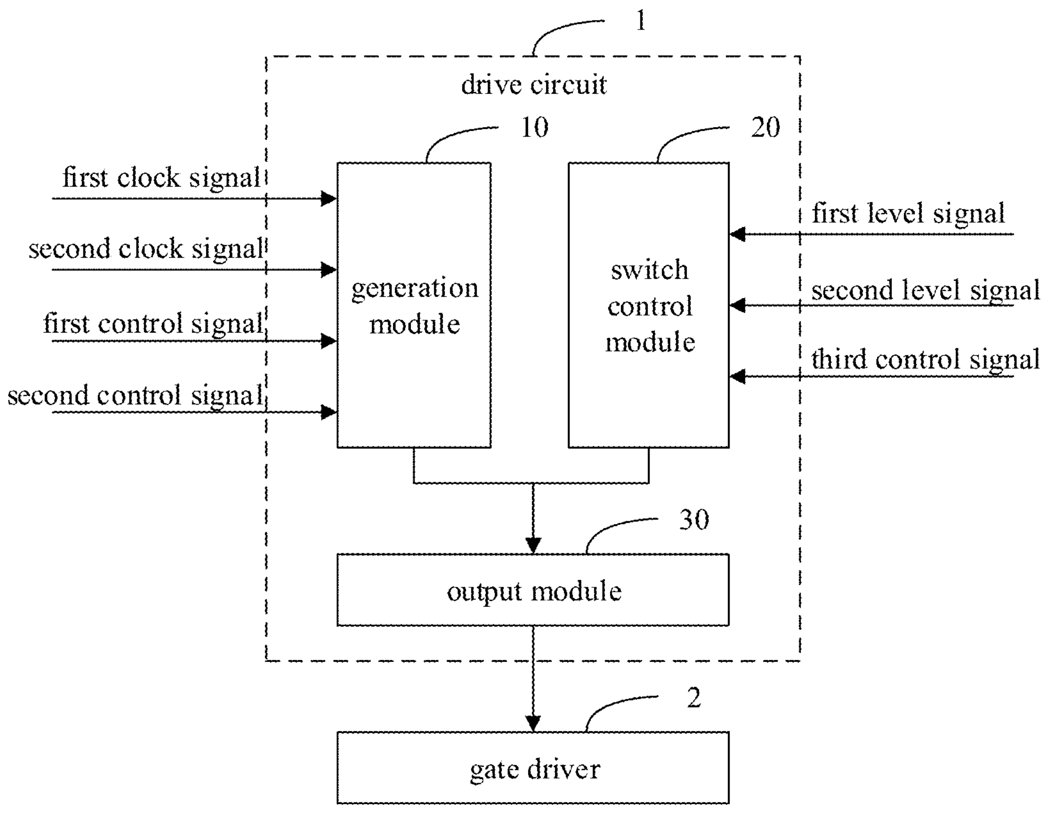
FIG. 1 is a first structural schematic diagram of a drive circuit for a display panel provided by an embodiment of the present application.

As shown in FIG. 1, a drive circuit 1 for a display panel provided in a first embodiment of the present application comprises: a generation module 10, a switch control module 20, and an output module 30.

The output module 30 is in electric connection with the generation module 10 and the switch control module 20 respectively.

The generation module 10 is configured to receive a first clock signal, a second clock signal, a first control signal, and a second control signal, and process the first clock signal and the second clock signal according to the first control signal and the second control signal to obtain a generated signal, and output the generated signal to the output module 30. The first clock signal and the second clock signal have a preset phase difference.

The switch control module 20 is configured to output a switch control signal to the output module 30 according to the received first level signal, second level signal, and third control signal.

The output module 30 is configured to output, when the third control signal is at a low level, the generated signal to a gate driver 2 according to the switch control signal; and the output module 30 is further configured to output, when the third control signal is at a high level, the first clock signal or the second clock signal to the gate driver 2 according to the switch control signal.

In application, the drive circuit may include electronic components such as multiple transistors, comparators, logic gates, resistors, capacitors or inductors; the first clock signal, the second clock signal, the first level signal, the second level signal, The first control signal, the second control signal, and the third control signal may be input to the drive circuit by a timing controller (Timer Control Register, TCON) or a system on chip (SOC); the second clock signal may be obtained by shifting a phase through the TCON or the SOC; and the preset phase difference between the phase shifted second clock signal and the first clock signal may range between 0° and 180°.

In application, a driving method of the generation module is described in detail below: the cycle of the first clock signal and the cycle of the second clock signal can have the same preset cycle, and the preset phase difference between the first clock signal and the second clock signal can be specifically 90°, that is, when the first clock signal is at a high level, the second clock signal is at a low level, similarly, when the second clock signal is at a high level, the first clock signal is at a low level flat.

The input of the generation module is the first clock signal and the second clock signal. Through the first control signal and the second control signal, the generated signal can include the first clock signal in the first time period, and include the second clock signal in the second time period. A length of the first time period and a length of the second time period can be the same and equal to a half of the preset cycle, and the first time period and the second time period are continuously alternated. The timing start point of the first time period and the timing end point of the second time period can be located at a quarter of any period of the first clock signal, then the timing end point of the first time period and the timing start point of the second time period are located at three-quarters of any period of the first clock signal. Or alternatively, the timing start point of the first time period and the timing end point of the second time period can be located at three-quarters of any cycle of the first clock signal, then the timing end point of the first time period and the timing start point of the second time period is located at a quarter of any cycle of the first clock signal; in which, the level of the first clock signal remains unchanged during the first half cycle and the level of the first clock signal also remains unchanged during the second half cycle. The first clock signal can be high level or low level during the first half cycle.

Figure 2:
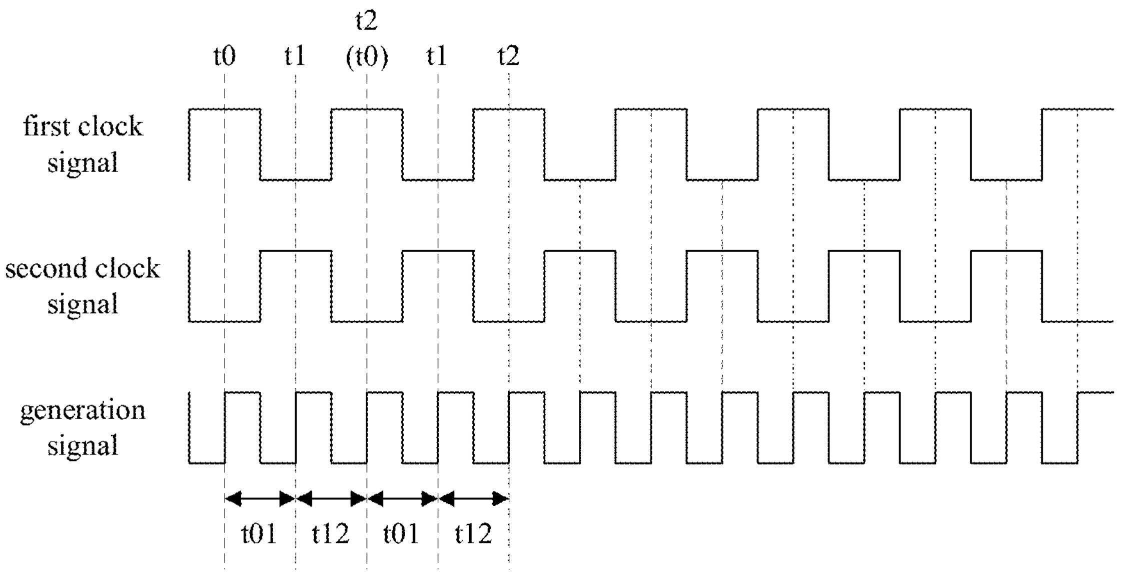
FIG. 2 is a timing schematic diagram of a first clock signal, a second clock signal, and a generated signal provided by an embodiment of the present application.

FIG. 2 exemplarily shows a timing schematic diagram of a first clock signal, a second clock signal, and a generated signal in a case that the generation module outputs the first clock signal in the first time period t01 and outputs the second clock signal in the second time period t12, in which, the timing start point of the first time period t01 is time point t0, the timing end point of the first time period t01 and the timing start point of the second time period are time point t1, and the timing end point of the second time period t12 is time point t2. Since the timing end point of the second time period in any cycle is also the timing start point of the first time period in a next cycle, the time point t2 in any cycle is also the time point t0 in the next cycle. The corresponding relationship between the timing and the generated signal is explained hereinbelow.

At the timing start point t0 of the first time period t01, the generation module starts to outputs the first clock signal, that is, the generated signal includes a high-level first clock signal; after a quarter of the first cycle, the generated signal is converted from the high-level first clock signal into a low-level first clock signal; after another quarter of the preset cycle, that is, at the timing end point of the first time period t01 and the timing start point t1 of the second time period t12, the generation module starts to output the second clock signal and stops outputting the first clock signal, that is, the generated signal includes a high-level second clock signal, so that the generated signal is converted from the low-level first clock signal to the high-level second clock signal; after still another quarter of the preset cycle, the generated signal is converted from the high-level second clock signal to a low-level second clock signal; and after still another quarter of the preset cycle, that is, at the timing end point t2 of the second time period t12, which means a cycle is completed, and meanwhile, it is also a timing start point t0 of a first time period t01 of a next cycle, and the next cycle starts, and the relationship between the timing and generated signal is consistent with above-mentioned cycle, so that the generated signal is continuously cycled in the first time period t01 and the second time period t12, which makes the output module output a stable generated signal, and the cycle of the generated signal is equal to a half of the preset cycle.

In application, a gate driver can be connected between the output module and the display panel, and the output signal of the output module can be output to the gate driver to control the gate driver to output a row driving signal, and to control the pixel gate of the display panel to scan row-by-row, thereby controlling the pixel charging cycle of the display panel, and in turn controlling the refresh rate of the display panel. Therefore, by changing the period of the output signal of the output module, the refresh rate of the display panel can be changed. The output module can have two types of output signals, the first type of output signal can be the first clock signal or the second clock signal, and the second type of output signal can be a generated signal.

In application, when the output signal of the output module is the first clock signal or the second clock signal, the cycle of the first clock signal and the cycle of the second clock signal are preset cycle, and the display panel is controlled to work at a first refresh rate. When the output signal of the output module is the generated signal and the cycle of the generated signal is half of the preset cycle, the display panel is controlled to work at a second refresh rate. It is easy to understand that when the cycle of the output signal of the output module is reduced to a half, the refresh rate of the display panel is doubled, in this way, by switching the signal output by the output module, the refresh rate of the display panel can be changed in real time, and the power consumption of the display panel having a high refresh rate can be reduced.

In application, the switch control module can be configured to switch the types of the output signal of the output module, so as to control the change of the refresh rate of the display panel. Specifically, when the third control signal is at the first preset level, by outputting, by the switch control module, the switch control signal to the output module, the type of the output signal can be switched to the generated signal; and when the third control signal is at a second preset level, by outputting, by the switch control module, the switch control signal to the output module, the type of the output signal can be switched to the first clock signal or the second clock signal, in this way, it is realized the seamless switching of the output module between outputting the first clock signal or the second clock signal and outputting the generated signal, so that the output signal can include the first clock signal and the generated signal, or include the second clock signal and the generated signal. The first preset level can be low level or high level, when the first preset level is a low level, the second preset level is a high level; similarly, when the first preset level is a high level, the second preset level is a low level.

In application, the output signal of the output module can be continuous and uninterrupted, which avoids the phenomenon of black screen and flickering caused by the interval between outputting two gate drive signals having different periods when the refresh rate changes in the traditional display panel, and since the pixels of the display panel need to be re-driven during the black screen and flickering, the service life of the display panel is affected once the refresh rate is switched. Therefore, the present application can reduce the power consumption of the display panel having high refresh rate, improve the display effect, and prolong the service life of the display panel.

Figure 3:
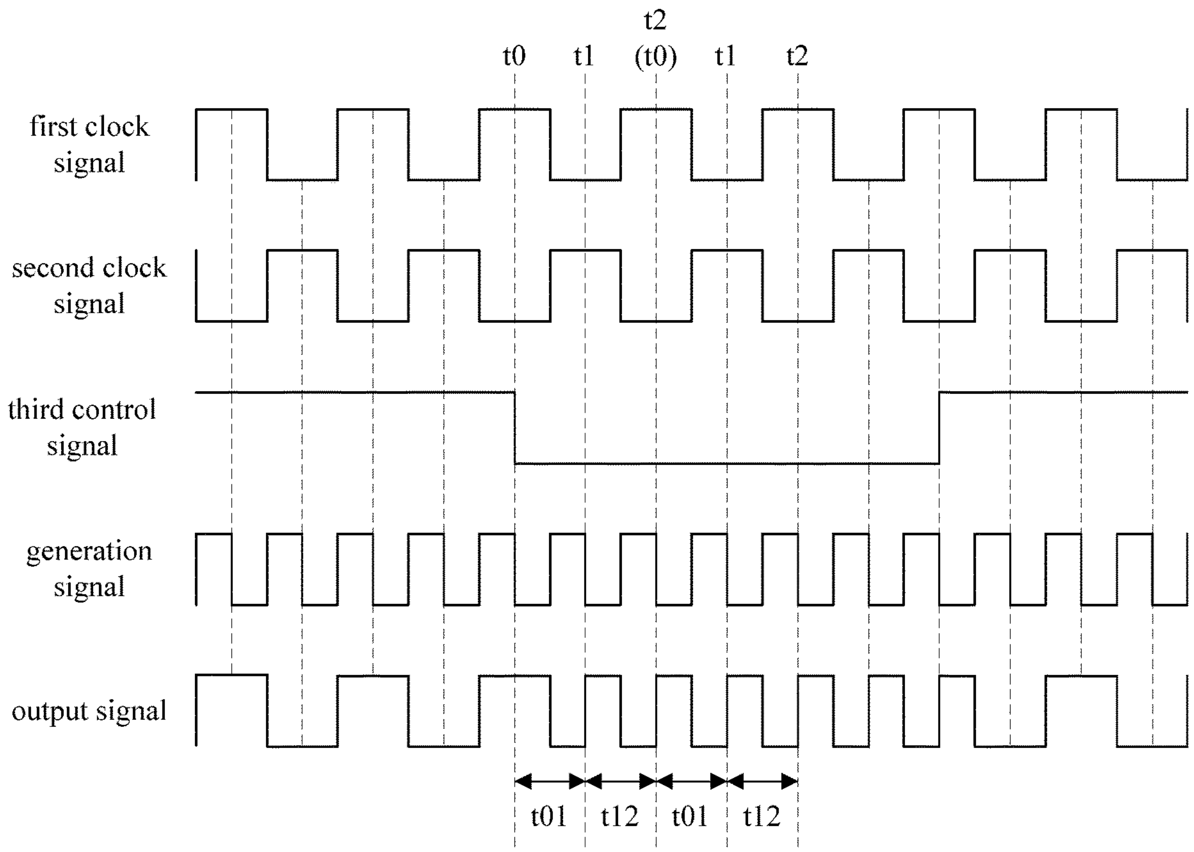
FIG. 3 is a timing schematic diagram of a first clock signal, a second clock signal, a third control signal, a generated signal, and an output signal including the first clock signal and the generated signal provided by an embodiment of the present application.

FIG. 3 exemplarily shows a timing diagram of a first clock signal, a second clock signal, a third control signal, a generated signal, and an output signal including the first clock signal and the generated signal, when the first preset level is a low level.

In an embodiment, a display state of the display panel is obtained through the switch control module, and a level of the third control signal is adjusted according to the display state of the display panel.

In application, when a display screen refresh rate of the display panel is lower than a preset threshold, the switch control module can control the third control signal to switch to the high level; when the display screen refresh rate of the display panel is higher than the preset threshold, the switch control module can control the third control signal to switch to the low level. The preset threshold can be the second refresh rate, specifically 60 Hz, 120 Hz, 144 Hz, or 240 Hz, and the like, so that the adaptive adjustment of the refresh rate can be realized, which improves the flexibility and controllability of changing the refresh rate of the display panel, and minimizes the power consumption of the display panel having a high refresh rate.

Figure 4:
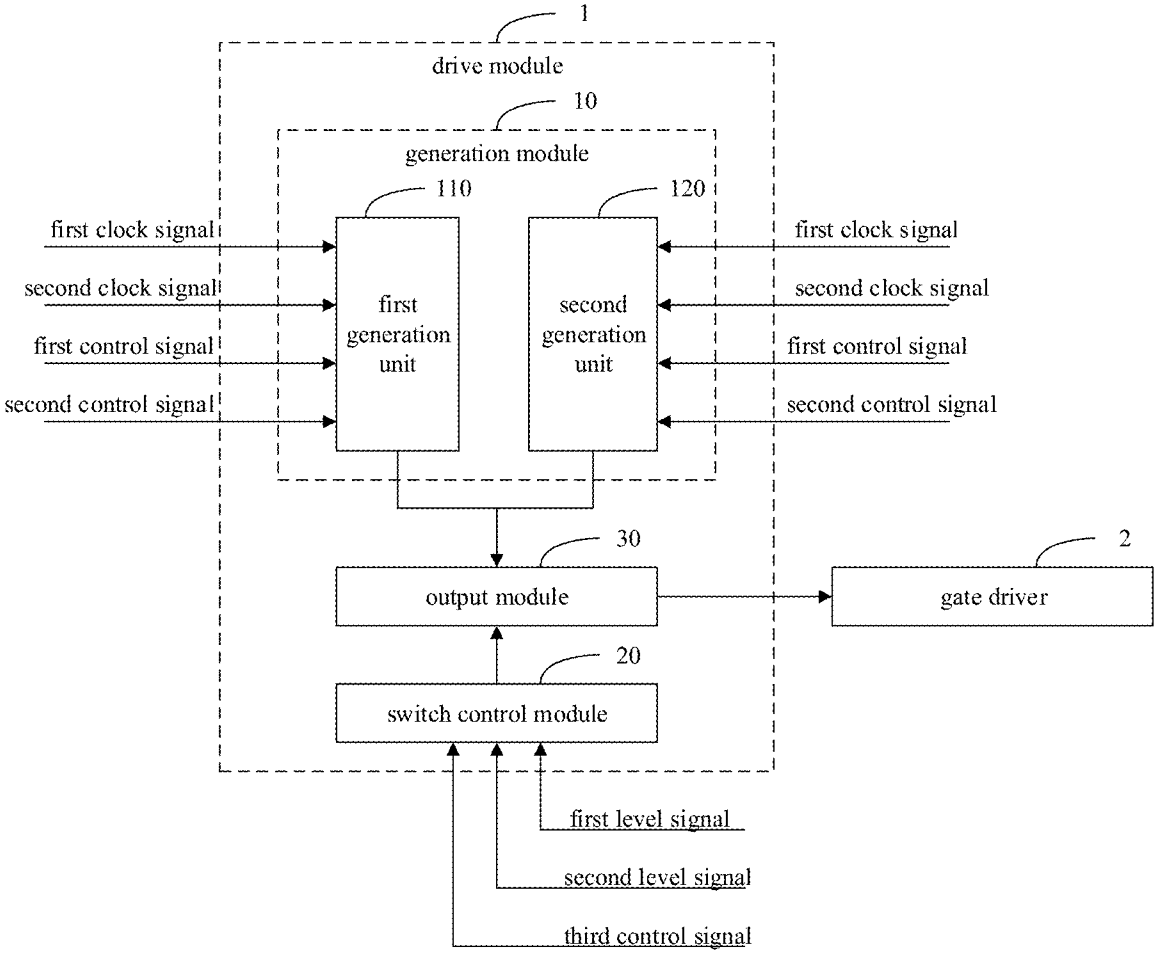
FIG. 4 is a second structural schematic diagram of a drive circuit for a display panel provided by an embodiment of the present application.

As shown in FIG. 4, which is a drive circuit 1 for the display panel provided by a second embodiment of the present application based on the first embodiment corresponding to FIG. 1, the generation module 10 includes a first generation unit 110 and a second generation unit 120.

The first generation unit 110 and the second generation unit 120 are in electric connection with the output module 30, respectively.

The first generation unit 110 is configured to process the first clock signal within the first time period to obtain a first generated signal, and output the first generated signal to the output module 30. The first generation unit 110 is further configured to process the second clock signal within the second time period to obtain a first generated signal, and output the first generated signal to the output module 30.

The second generation unit 120 is configured to process the second clock signal within the first time period to obtain a second generated signal, and output the second generated signal to the output module 30. The second generation unit 120 is also configured to process the first clock signal during the second time period to obtain a second generated signal, and output the second generated signal to the output module 30.

During the first time period, the first control signal is at a high level and the second control signal is at a low level, and during the second time period, the first control signal is at a low level and the second control signal is at a high level.

In application, the generation module may include a plurality of generation units, and the generated signals output by any two generation units have a phase difference. Specifically, the generation module may include a first generation unit and a second generation unit. The input of the first generation unit includes: the first clock signal, the second clock signal, the first control signal, and the second control signal, the output of the first generation unit can be controlled by the first control signal and the second control signal, so that the first generation unit can generate the first generated signal; and the first generated signal is the first clock signal in the first time period and is the second clock signal in the second time period. The input of the second generation unit also includes: the first clock signal, the second clock signal, the first control signal, and the second control signal, the output of the second generation unit can be controlled by the first control signal and the second control signal, so that the second generation unit can generate the second generated signal, and the second generated signal is the second clock signal in the first time period and is the first clock signal during the second time period.

In application, the first control signal can be obtained by phase shifting the first clock signal or the second clock signal through TCON or SOC. Similarly, the second control signal can also be obtained by phase shifting the first clock signal or the second clock signal through TCON or SOC. A phase difference between the first control signal and the first clock signal can be 45° or 135°, and the phase difference between the second control signal and the first control signal can be 90°. When the first control signal is at a high level, the second control signal is at a low level.

Figure 5:
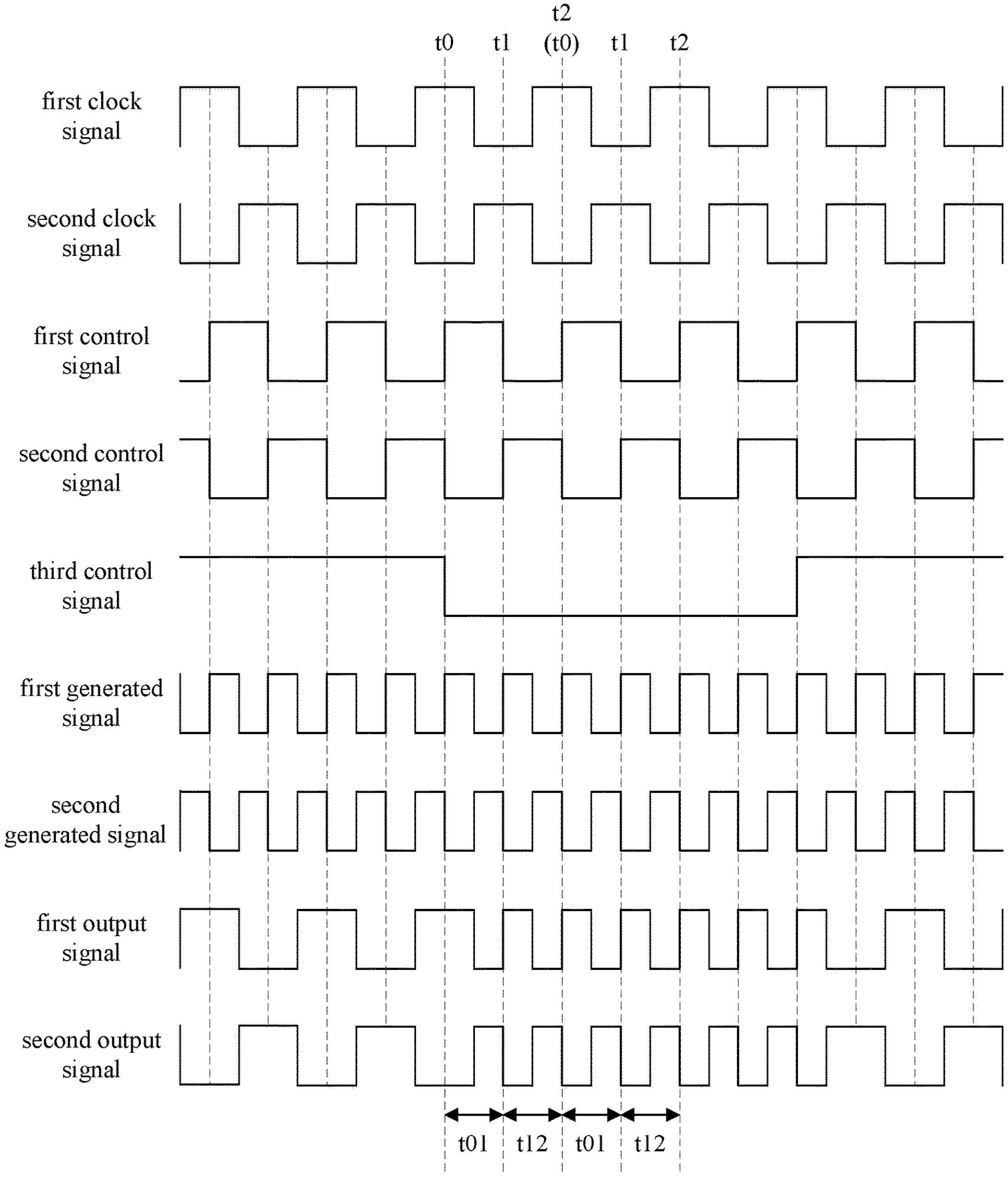
FIG. 5 is a timing schematic diagram of a first clock signal, a second clock signal, a first control signal, a second control signal, a third control signal, a first generated signal, a second generated signal, a first output signal, and a second output signal provided by an embodiment of the present application.

FIG. 5 exemplarily shows a timing diagram of a first clock signal, a second clock signal, a first control signal, a second control signal, a third control signal, a first generated signal, and a second generated signal, hereinbelow, the functions of the first control signal and the second control signal are explained in details in combination with FIG. 5.

At the timing start point t0 of the first time period t01 (the timing end point t2 of the second time period t12), the first control signal is switched to a high level and the second control signal is switched to a low level, the first generation unit is controlled to output the first clock signal, and the second generation unit is controlled to output the second clock signal; and at the timing end point of the first time period t01 and the timing start point t1 of the second time period t12, the first control signal is switched to the low level and the second control signal is switched to the high level, the first generation unit is controlled to output the second clock signal, and the second generation unit is controlled to output the first clock signal. The cycle is continued in this way, so that the first generated signal includes the first clock signal and the second clock signal, And the second generated signal includes the first clock signal and the second clock signal, both the cycle of the first generated signal and the cycle second generated signal are equivalent to a half of a preset cycle, and a phase difference between the first generated signal and the second generated signal is 90°.

In application, the first generation unit and the second generation unit can be controlled simply and effectively through the cooperation of the first control signal and the second control signal, thereby improving the stability and reliability of the first generated signal and the second generated signal.

Figure 6:
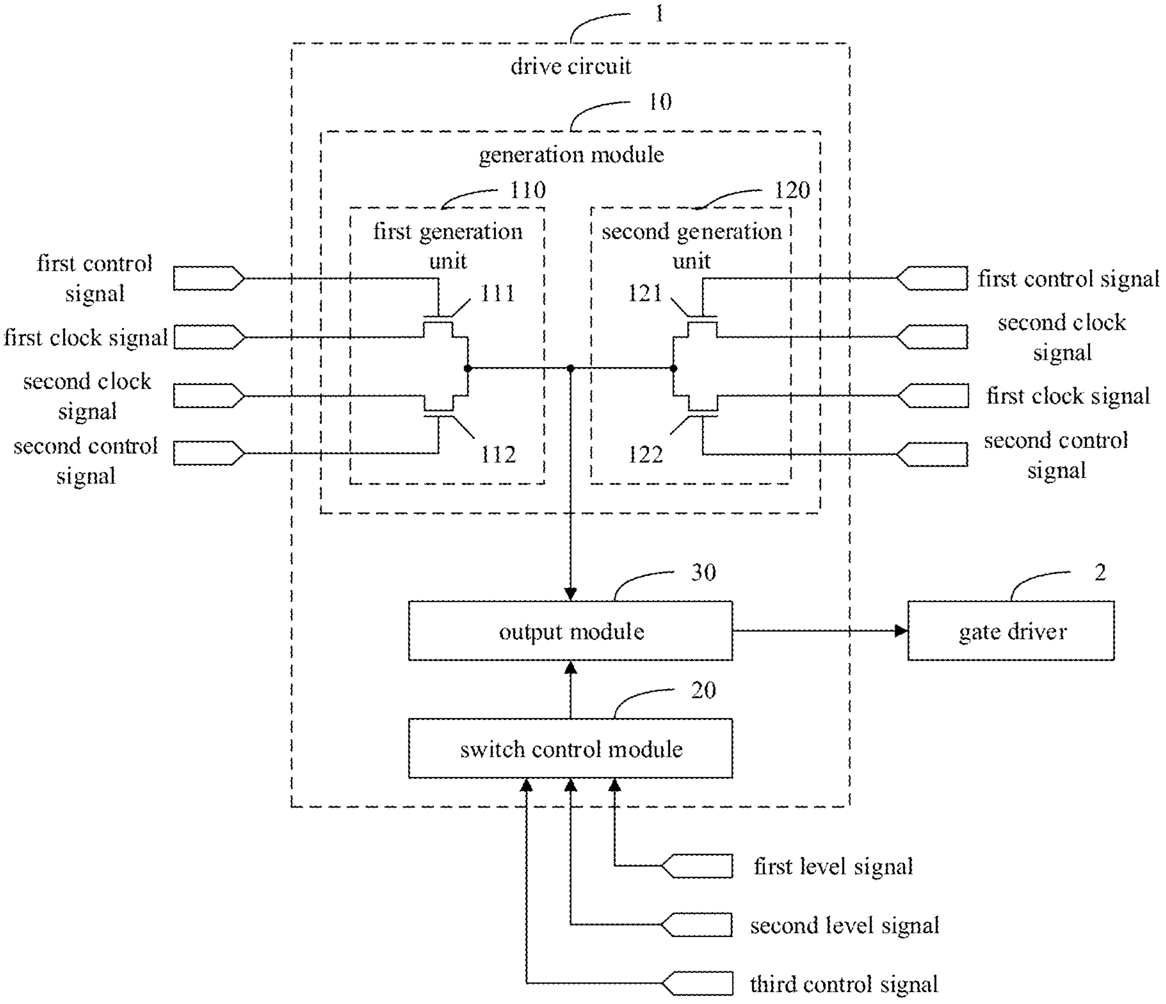
FIG. 6 is a third schematic structural diagram of a drive circuit for a display panel provided by an embodiment of the present application.

As shown in FIG. 6, which is a drive circuit 1 for the display panel provided by a third embodiment of the present application and is based on the second embodiment corresponding to FIG. 4, the first generation unit 110 includes a first electronic switch 111 and a second electronic switch 112.

A drain of the first electronic switch 111 is in electric connection with a drain of the second electronic switch 112, a source of the first electronic switch 111 is configured to receive the first clock signal, and a gate of the first electronic switch 111 is configured to receive the first control signal, and the drain of the first electronic switch 111 is configured to output the first clock signal to the output module 30 within the first time period.

A source of the second electronic switch 112 is configured to receive the second clock signal, a gate of the second electronic switch 112 is configured to receive the second control signal, and the drain of the second electronic switch 112 is configured to output the second clock signal to the output module 30 within the second time period.

The first generated signal includes the first clock signal and the second clock signal.

In application, the first electronic switch and the second electronic switch can be any device or circuit having electronic switch function, for example, triode or metal oxide semiconductor field effect transistor (MOSFET), specifically, may be a thin film field effect transistor (TFT).

In application, at the timing start point t0 of the first time period t01, the first control signal is switched to the high level and the second control signal is switched to the low level, the gate of the first electronic switch is at the high level, the first electronic switch is turned on, and the drain of the first electronic switch starts to output the first clock signal; and the gate of the second electronic switch is at the low level, the second electronic switch is turned off, and the second electronic switch stops outputting the second clock signal, thus, it is realized that the first generation unit outputs the first clock signal in the first time period.

In application, at the timing end point of the first time period t01 and the timing start point t1 of the second time period t12, the first control signal is switched to the low level and the second control signal is switched to the high level, the gate of the first electronic is at the low level, the first electronic switch is turned off, the first electronic switch stops outputting the first clock signal; and the gate of the second electronic switch is at the high level, the second electronic switch is turned on, and the drain of the second electronic switch starts to output the second clock signal, thus, it is realized that the first generation unit outputs the second clock signal in the second time period, and in turn the first generation unit outputs the first generated signal.

In application, the first generation unit composed of the first electronic switch and the second electronic switch has the advantages of simple structure, easy control, stable output, and low cost, which can improve the stability of the drive circuit and reduce the production cost of the display panel.

As shown in FIG. 6, which is a drive circuit 1 for the display panel provided by a fourth embodiment of the present application and is based on the second embodiment corresponding to FIG. 4, the second generation unit 120 includes a third electronic switch 121 and a fourth electronic switch 122.

A drain of the third electronic switch 121 is in electric connection with a drain of the fourth electronic switch 122, a source of the third electronic switch 121 is configured to receive the second clock signal, a gate of the third electronic switch 121 is configured to receive the first control signal, and the drain of the third electronic switch 121 is configured to output the second clock signal to the output module within the first time period.

A source of the fourth electronic switch 122 is configured to receive the first clock signal, a gate of the fourth electronic switch 122 is configured to receive the second control signal, and the drain of the fourth electronic switch 122 is configured to output the first clock signal to the output module within the second time period.

The second generated signal includes a first clock signal and a second clock signal.

In application, the selection of the third electronic switch and the fourth electronic switch is consistent with the selection of the first electronic switch and the second electronic switch, and will not be repeated here.

In application, at the timing start point t0 of the first time period t01, the first control signal is switched to the high level and the second control signal is switched to the low level, the gate of the third electronic switch is at the high level, the third electronic switch is turned on, and the drain of the third electronic switch starts to output the second clock signal; and the gate of the fourth electronic switch is at the low level, the fourth electronic switch is turned off, and the fourth electronic switch stops outputting the first clock signal, in this way, it is realized that the second generation unit outputs the second clock signal during the first time period.

In application, at the timing end point of the first time period t01 and the timing start point t1 of the second time period t12, the first control signal is switched to the low level and the second control signal is switched to the high level, the gate of the third electronic is switched to the low level, the third electronic switch is turned off, the third electronic switch stops outputting the second clock signal; and the gate of the fourth electronic switch is at the high level, the fourth electronic switch is turned on, and the drain of the fourth electronic switch starts to output the first clock signal, thus, it is realized that the second generation unit outputs the first clock signal in the second time period, and in turn the second generation unit outputs the second generated signal.

In application, the second generation unit composed of the third electronic switch and the fourth electronic switch has the advantages of simple structure, easy control, stable output, and low cost, which can improve the stability of the drive circuit and reduce the production cost of the display panel.

Figure 7:
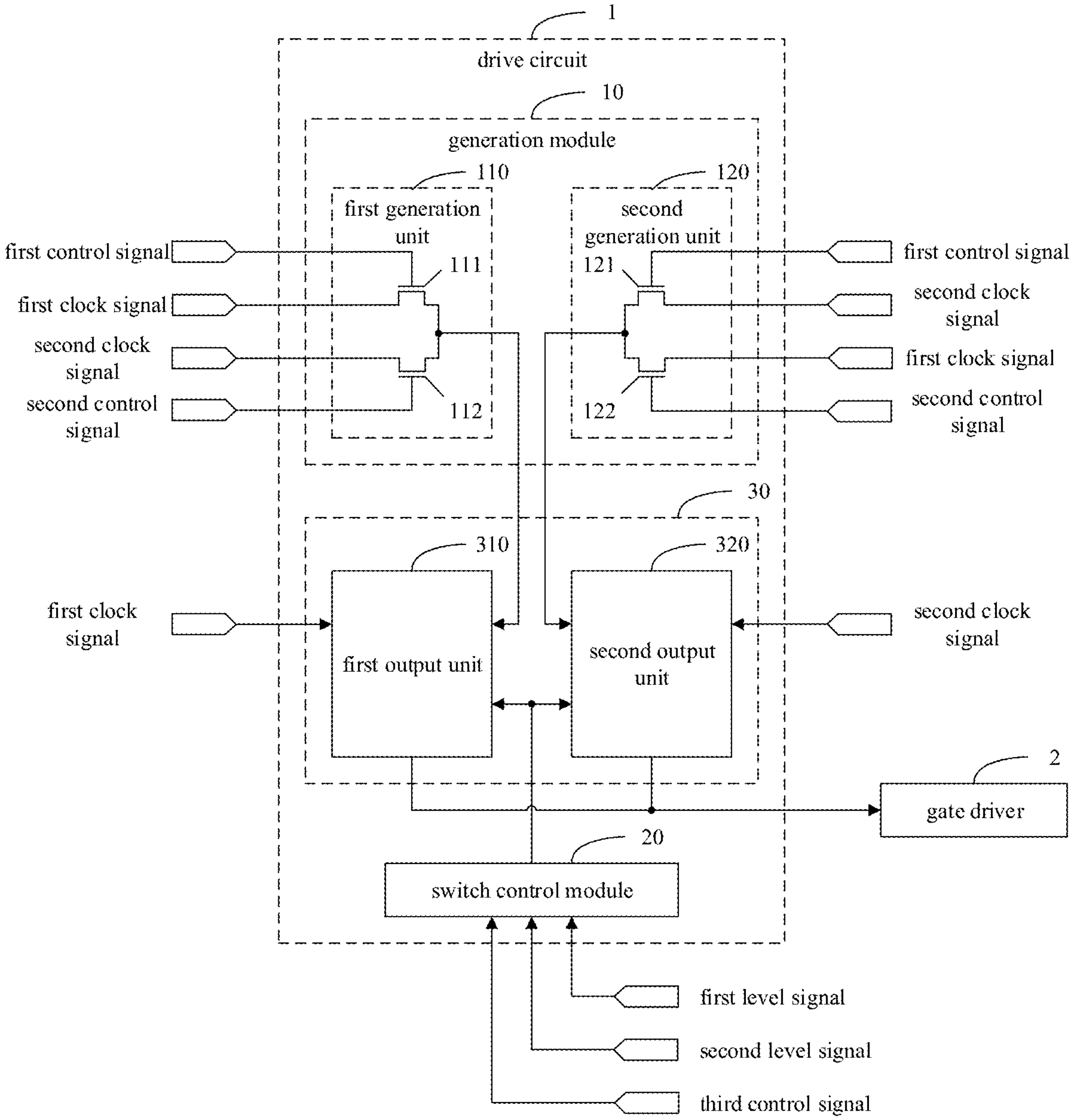
FIG. 7 is a fourth schematic structural diagram of a drive circuit for a display panel provided by an embodiment of the present application.

As shown in FIG. 7, which is a drive circuit 1 provided by a fifth embodiment of the present application based on the third embodiment and the fourth embodiment corresponding to FIG. 6, the output module 30 includes a first output unit 310 and a second output unit 320.

The first output unit 310 is in electric connection with the first generation unit 110 and the switch control module 20, respectively, and the second output unit 320 is in electric connection with the second generation unit 120 and the switch control module 20, respectively.

The first output unit 310 is configured to: receive, when the third control signal is at the low level, the first generated signal and output the first generated signal to the gate driver 2; and is further configured to: receive, when the third control signal is at the high level, the first clock signal and output the first clock signal to the gate driver 2.

The second output unit 320 is configured to: receive, when the third control signal is at the low level, the second generated signal and output the second generated signal to the gate driver 2; and is further configured to: receive, when the third control signal is at the high level, the second clock signal and output the second clock signal to the gate driver 2.

In application, the output module can include multiple output units, and the number of output units can be determined according to the number of generation units. Specifically, the number of output units can be consistent with the number of generation units, and multiple output units and multiple generation units are in one-to-one correspondence, each output unit is configured to receive the generated signal output by the corresponding generation unit, and receive the first clock signal or the second clock signal, the output signal of each output unit may include the first clock signal and the generated signal output by the corresponding generation unit, or alternatively, may include the second clock signal and the generated signal output by the corresponding generation unit.

In an application, when the generation module includes a first generation unit and a second generation unit, the output module may include a first output unit and a second output unit, and the input of the first output unit is the first generated signal, the first clock signal and the switch The control signal controls the output of the first output unit through the switch control signal, so that the first output unit can output the first output signal. The first output signal includes two types of output signals, the first clock signal and the first generated signal, and according to The third control signal switches the output signal type of the first output signal. Specifically, when the third control signal is at a low level, the first output unit receives the first generated signal and stops receiving the first clock signal, so the first output signal includes The first generated signal outputs the above-mentioned first output signal to the gate driver; when the third control signal is at a high level, the first output unit receives the first clock signal and stops receiving the first generated signal, so the first output signal includes the first output signal A clock signal, outputting the above-mentioned first output signal to the gate driver.

In application, the input of the second output unit includes the second generated signal, the second clock signal, and the switch control signal, and the output of the second output unit can be controlled by the switch control signal, so that the second output unit can output the second output signal. The second output signal includes two types of output signals, that is, the second generated signal and the second clock signal; and the output signal type of the second output signal is switched according to the third control signal. Specifically, when the third control signal is at the low level, the second output unit receives the second generated signal and stops receiving the second clock signal, so that the second output signal includes the second generated signal and is output to the display panel or the gate driver; and when the third control signal is at the high level, the second output unit receives the second clock signal and stops receiving the second generated signal, so that the second output signal includes the second clock signal and is output to the display panel or the gate driver. It should be noted that the first output signal may also include the second clock signal and the first generated signal. Similarly, the second output signal may also include the first clock signal and the second generated signal. The output signal types included in the output signal may be freely collocated according to actual needs.

FIG. 5 exemplarily shows a timing schematic diagram of a first clock signal, a second clock signal, a first control signal, a second control signal, a third control signal, a first generated signal, a second generated signal, a first output signal, and a second output signal provided by an embodiment of the present application.

In application, when the third control signal is at the low level, the phase difference between the first generated signal included in the first output signal and the second generated signal included in the second output signal is 90°, and when the third control signal is at the high level, the phase difference between the first clock signal included in the first output signal and the second generated signal included in the second output signal is also 90°. In a case where the number of clock generators configured to generate the clock signal remains unchanged, the multiple output units included in the output module can provide two or more output signals with different phases for the source driver. When the number of output signals increases, a single output signal can reduce the number of gate drive circuits that need to be input, so as to reduce the load of each output signal, as well as reduce the number of clock generators of the display panel, thereby improving the display stability of the display panel and reducing the production cost of the display panel.

Figure 8:
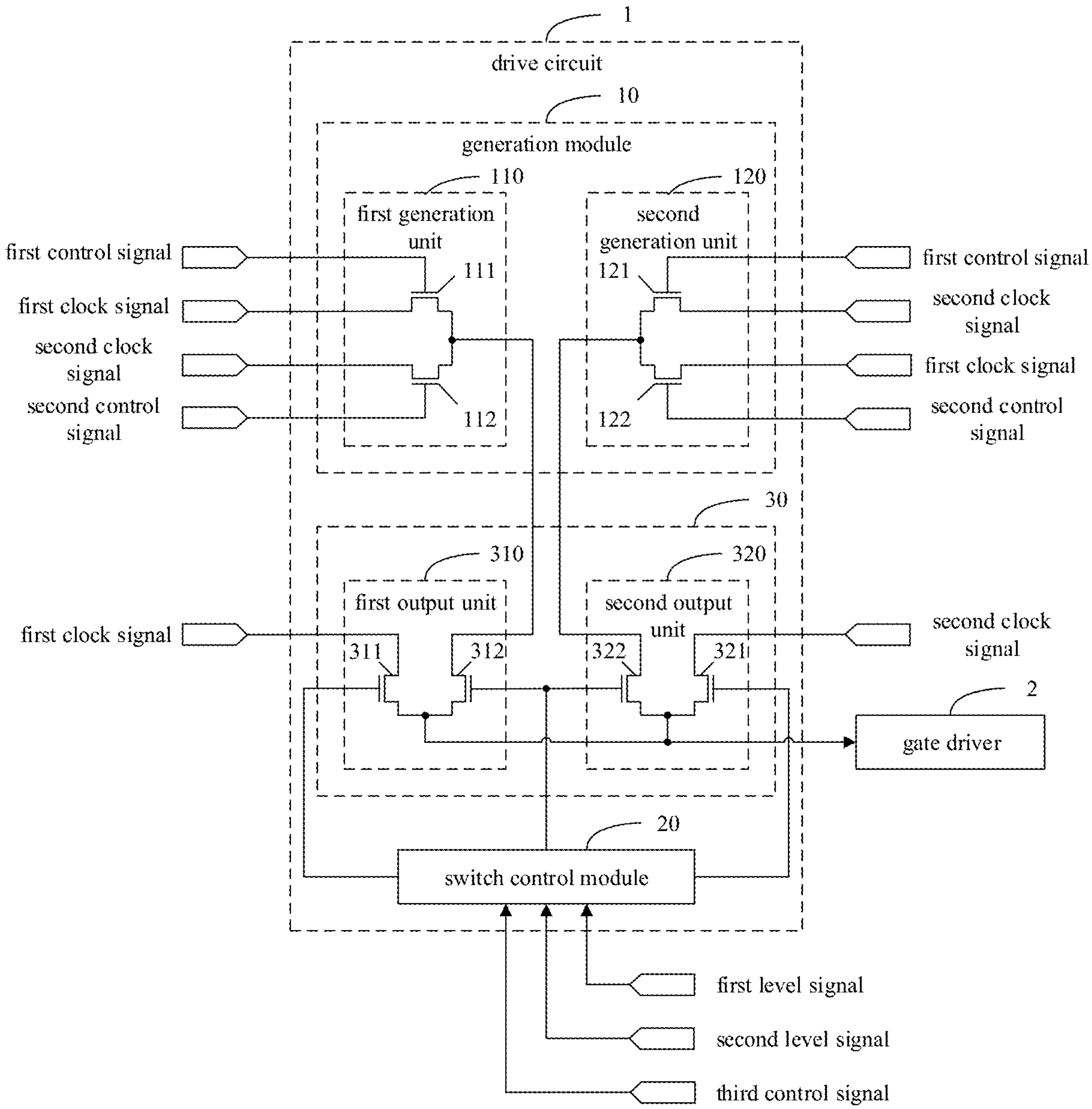
FIG. 8 is a fifth schematic structural diagram of a drive circuit for a display panel provided by an embodiment of the present application.

As shown in FIG. 8, which is a drive circuit 1 provided by a sixth embodiment of the present application based on the fifth embodiment corresponding to FIG. 7, the first output unit 310 includes a fifth electronic switch 311 and a sixth electronic switch 312.

A drain of the fifth electronic switch 311 is in electric connection with a drain of the sixth electronic switch 312, a source of the fifth electronic switch 311 is configured to receive the first clock signal, a gate of the fifth electronic switch 311 is configured to receive the switch control signal, and the drain of the fifth electronic switch 311 is configured to output the first clock signal to the gate driver 2 when the third control signal is at the high level.

A source of the sixth electronic switch 312 is configured to receive the first generated signal, a gate of the sixth electronic switch 312 is configured to receive the switch control signal, and the drain of the sixth electronic switch 312 is configured to output the first generated signal to the gate driver 2 when the third control signal is at the low level.

In application, the selection of the fifth electronic switch and the sixth electronic switch is consistent with the selection of the first electronic switch and the second electronic switch, and will not be repeated here.

In application, when the third control signal is at the low level, the switch control signal is input to the sixth electronic switch and stops being input to the fifth electronic switch; the switch control signal is at the high level, then the gate of the sixth electronic switch is at the high level, the sixth electronic switch is turned on and the fifth electronic switch is turned off, and the drain of the sixth electronic switch outputs the first generated signal, so that the first output unit outputs the first generated signal.

In application, when the third control signal is at the high level, the switch control signal is input to the fifth electronic switch and stops being input to the sixth electronic switch; the switch control signal is at the high level, then the gate of the fifth electronic switch is at the high level the fifth electronic switch is turned on and the sixth electronic switch is turned off, and the drain of the fifth electronic switch outputs the first clock signal, so that the first output unit outputs the first clock signal, and the first output unit outputs the first output signal.

In application, the first output unit composed of the fifth electronic switch and the sixth electronic switch has the advantages of simple structure, easy control, stable output, and low cost. In combination with the first generation unit having the same advantages, the stability of the drive circuit can be greatly improved and the production cost of the display panel can be reduced.

As shown in FIG. 8, which is a drive circuit 1 provided by the seventh embodiment of the present application based on the fifth embodiment corresponding to FIG. 7, the second output unit 320 includes a seventh electronic switch 321 and an eighth electronic switch 322.

A drain of the seventh electronic switch 321 is in electric connection with a drain of the eighth electronic switch 322, a source of the seventh electronic switch 321 is configured to receive the second clock signal, a gate of the seventh electronic switch 321 is configured to receive the switch control signal, the drain of the seventh electronic switch 321 is configured to output the second clock signal to the gate driver 2 when the third control signal is at the high level.

A source of the eighth electronic switch 322 is configured to receive the second generated signal, a gate of the eighth electronic switch 322 is configured to receive the switch control signal, and the drain of the eighth electronic switch 322 is configured to output the second generated signal to the gate driver 2 when the third control signal is at the low level.

In application, the selection of the seventh electronic switch and the eighth electronic switch is consistent with the selection of the first electronic switch and the second electronic switch, and will not be repeated here.

In application, when the third control signal is at the low level, the switch control signal is input to the eighth electronic switch and stops being input to the seventh electronic switch; the switch control signal is at the high level, then the gate of the eighth electronic switch is at the high level, the eighth electronic switch is turned on and the seventh electronic switch is turned off, and the drain of the eighth electronic switch outputs the second generated signal, so that the second output unit outputs the second generated signal.

In application, when the third control signal is at the high level, the switch control signal is input to the seventh electronic switch and stops inputting to the eighth electronic switch; the switch control signal is at the high level, then the gate of the seventh electronic switch is at the high level, the seventh electronic switch is turned on and the eighth electronic switch is turned off, the drain of the seventh electronic switch outputs the second clock signal, so that the second output unit outputs the second clock signal, and the second output unit in turn outputs the second output signal.

In application, the second output unit composed of the seventh electronic switch and the eighth electronic switch has the advantages of simple structure, easy control, stable output, and low cost. In combination with the second generation unit having the same advantages, the stability of the drive circuit can be greatly improved and the production cost of the display panel can be reduced.

Figure 9:
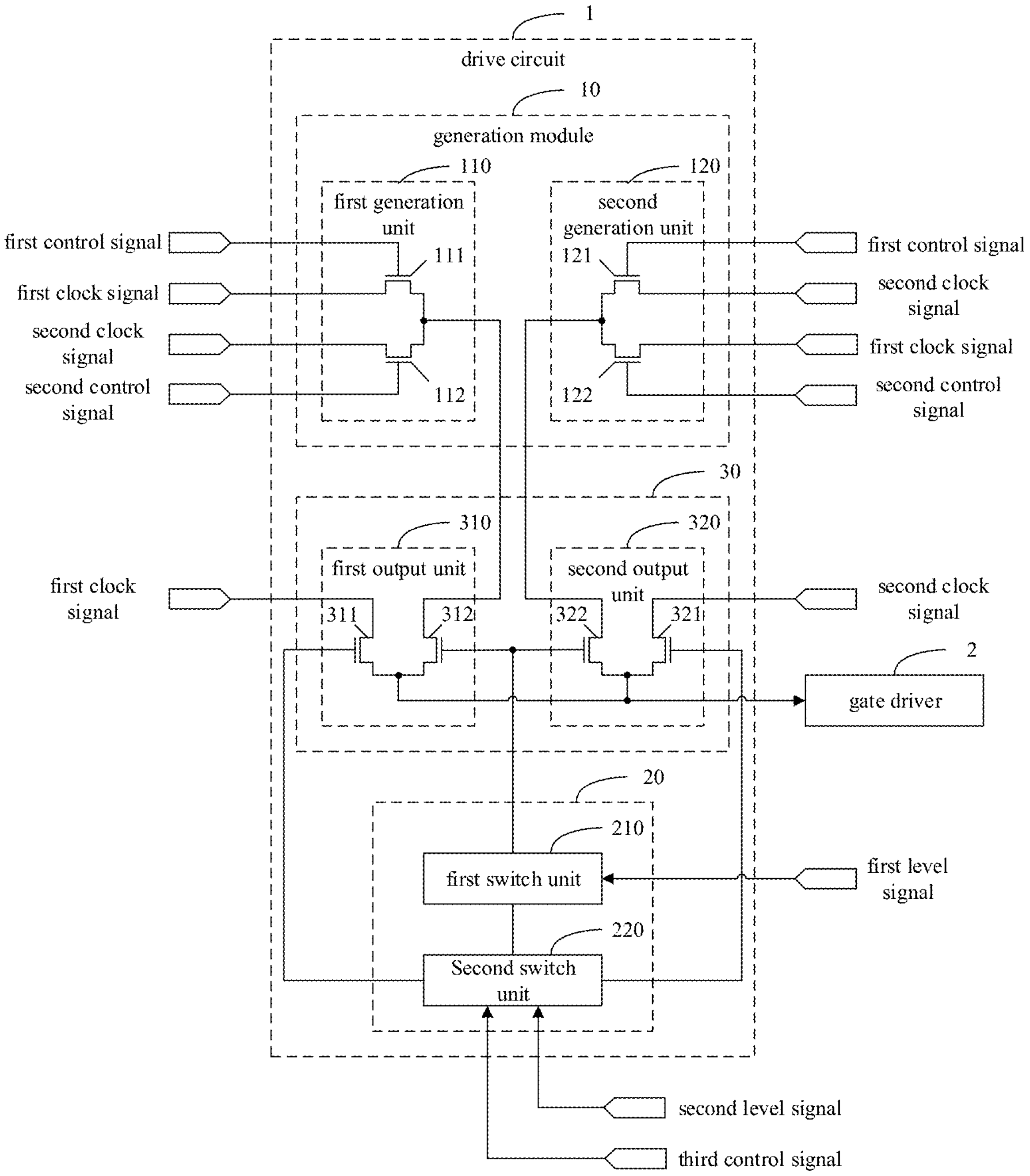
FIG. 9 is a sixth schematic structural diagram of a drive circuit for a display panel provided by an embodiment of the present application.

As shown in FIG. 9, which is a drive circuit 1 provided in the eighth embodiment of the present application based on the sixth embodiment and the seventh embodiment corresponding to FIG. 7, the switch control module 20 includes a first switch unit 210 and a second switch unit 220.

The first switch unit 210 is in electric connection with the second switch unit 220, the first output unit 310, and the second output unit 320, respectively, and the second switch unit 220 is in electric connection with the first output unit 310 and the second output unit 320, respectively.

The first switch unit 210 is configured to receive the first level signal, and output, when the third control signal is at the low level, a first switch control signal to the first output unit 310 and the second output unit 320, in which, the first switch control signal is at a high level.

The second switch unit 220 is configured to receive the second level signal and the third control signal, and output, when the third control signal is at the high level, a second switch control signal to the first output unit 310 and the second output unit 320, in which, the second switch control signal is at a high level.

In application, the first level signal may be a high level signal, the second level may be a low level signal, and the third control signal may be a pulse signal having an adjustable level. The switch control module may include two switch units, specifically a first switch unit and a second switch unit. The first switch unit is configured to output the first switch control signal to all output units, so as to control all output units to output generated signal output by the corresponding generation units; and the second switch unit is configured to output a second switch control signal to the output unit, so as to control all output units to output the first clock signal or the second clock signal.

In application, the input of the first switch unit is the first level signal, and when the third control signal is at the low level, the first switch control signal is output to the first output unit and the second output unit, the second switch unit stops outputting the second switch control signal, and the first switch control signal is a high-level first level signal, thereby controlling the first output unit to output the first generated signal, controlling the second output unit to output the second generated signal, and in turn controlling the display panel to operate at the second refresh rate.

In application, the input of the second switch unit is the second level signal and the third control signal, and when the third control signal is at the high level, the second switch control signal is output to the first output unit and the second output unit, and the first switch unit stops outputting the first switch control signal, and the second switch control signal is a high-level third control signal, thereby controlling the first output unit to output the first clock signal, controlling the second output unit to output the second clock signal, and in turn controlling the display panel to work at the first refresh rate.

In application, the type of the output signal of the output module can be switched by switching the level of the third control signal, based on such setting, the refresh rate of the display panel can be changed through an independent signal, thereby increasing the response speed to the request for changing the refresh rate, and providing better visual effect and experience to the user.

Figure 10:
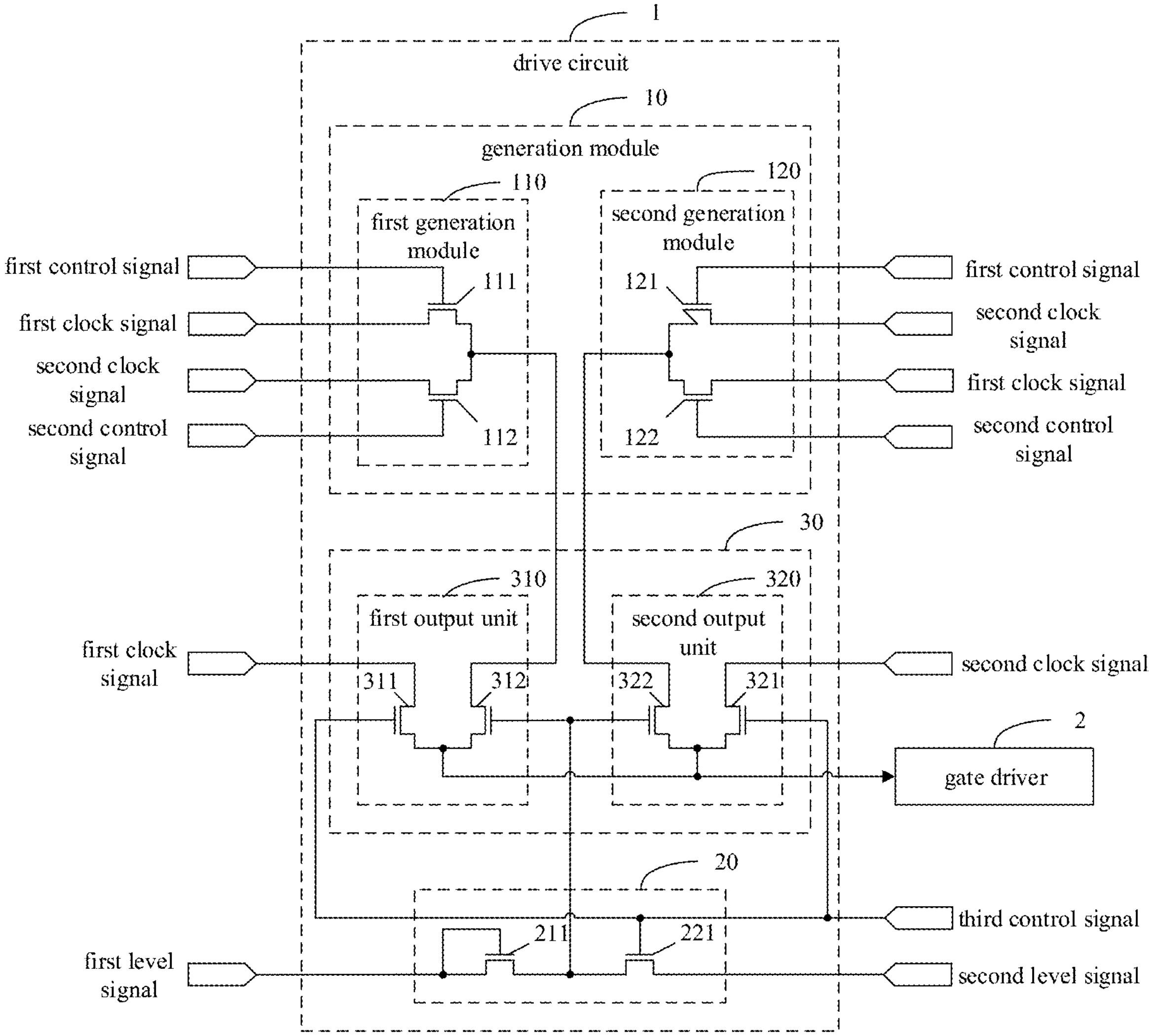
FIG. 10 is a seventh schematic structural diagram of a drive circuit for a display panel provided by an embodiment of the present application.

As shown in FIG. 10, which is a drive circuit 1 provided by a ninth embodiment of the present application based on the eighth embodiment corresponding to FIG. 9, the first switch unit includes a ninth electronic switch 211, and the second switch unit includes a tenth electronic switch 221.

A source and a gate of the ninth electronic switch 211 are configured to receive the first level signal, and a drain of the ninth electronic switch 211 is configured to output, when the third control signal is at the low level, the first switch control signal to a sixth electronic switch of the first output unit 310 and an eighth electronic switch of the second output unit 320.

A source of the tenth electronic switch 221 is configured to receive the second level signal, a gate of the tenth electronic switch 221 is configured to receive the third control signal, and a drain of the tenth electronic switch 221 is configured to output, when the third control signal is at the high level, the second switch control signal to a fifth electronic switch of the first output unit 310 and a seventh electronic switch of the second output unit 320.

In application, the selection of the ninth electronic switch and the tenth electronic switch is consistent with the selection of the first electronic switch and the second electronic switch, and will not be repeated here.

In application, when the third control signal is at the low level, the gate of the tenth electronic switch is at the low level, and the tenth electronic switch is turned off; the source and the gate of the ninth electronic switch receive the first level signal, the ninth electronic switch is turned on, then the drain of the ninth electronic switch outputs the first switch control signal to the sixth electronic switch of the first output unit, and the eighth electronic switch of the second output unit, so that the sixth electronic switch and the eighth electronic switch are turned on, thereby controlling the first output unit to output the first generated signal, and controlling the second output unit to output the second generated signal.

In application, when the third control signal is at the high level, the gate of the tenth electronic switch is at the high level, and the tenth electronic switch is turned on. The source and the gate of the ninth electronic switch receive the first level signal, and the ninth electronic switch is turned on, the drain of the ninth electronic switch is at the high level, the source of the tenth electronic switch is at the low level, and the voltage at the drain of the ninth electronic switch and the voltage at the drain of the tenth electronic switch will be neutralized to a low level, so that the sixth electronic switch of the first output unit and the eighth electronic switch of the second output unit are turned off. The third control signal can be output to the fifth electronic switch of the first output unit, and the seventh electronic switch of the second output, which makes the fifth electronic switch and the seventh electronic switch turn on, thereby controlling the first output unit to output the first clock signal and controlling the second output unit to output the second clock signal.

In application, the ninth electronic switch and the tenth electronic switch can respond synchronously according to the level of the third control signal, can change the refresh rate of the display panel in real time, and greatly improve the response speed to the request for changing the refresh rate.

The drive circuit of the display panel provided in embodiments of the present application includes: a generation module, an output module, and a switch control module. The output module is in electric connection with the generation module and the switch control module respectively. The generation module is configured to output the generated signal to the output module according to the received first clock signal, second clock signal, first control signal, and second control signal; in which, the generated signal includes the first clock signal and the second clock signal. The switch control module is configured to output the switch control signal to the output module according to the received first level signal, second level signal, and third control signal. When the third control signal is at the low level, the output module is configured to output a generated signal to the display panel according to the switch control signal output. When the third control signal is at the high level, the output module is also configured to output the first clock signal and the second clock signal to the display panel according to the switch control signal. In this way, the refresh rate of the display panel can be changed in real time and the power consumption of the display panel having high refresh rate can be reduced, meanwhile, the output signal of the output module can be continuous without interruption, thereby improving the display effect of the display panel and prolonging the service life of the display panel.

Figure 11:
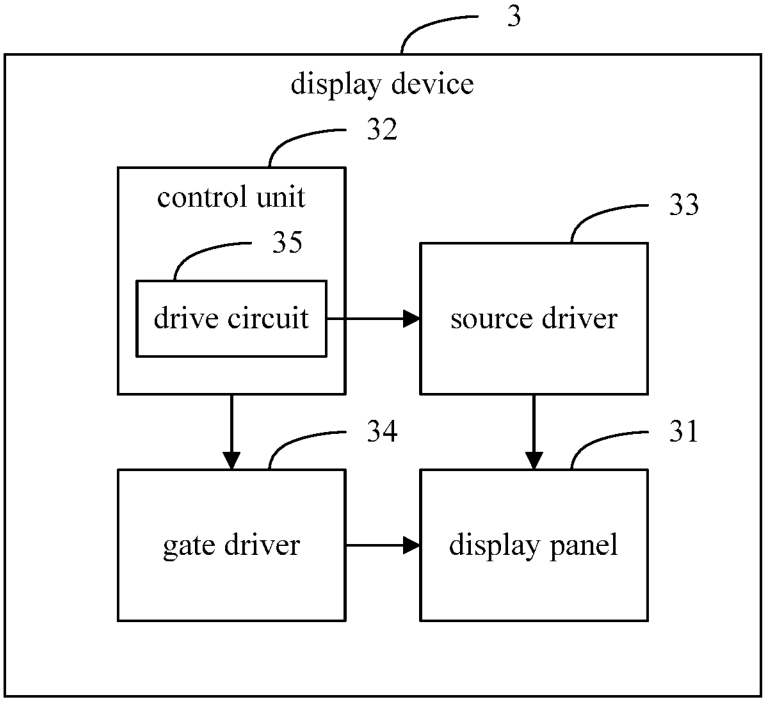
FIG. 11 is a schematic structural diagram of a display device provided by an embodiment of the present application.

As shown in FIG. 11, a tenth embodiment of the present application further provides a display device 3, including: a display panel 31, a control unit 32, a source driver 33, and a gate driver 34.

The display panel 31 is in connection with the source driver 33 and the gate driver 34, respectively, and the control unit 32 is in connection with the source driver 33 and the gate driver 34, respectively.

The control unit 32 includes the drive circuit provided by any one of the first embodiment to the ninth embodiment of the present application.

The drive circuit 35 of the control unit 32 is in connection with the gate driver 34.

In application, the functions of the display device include the functions of the drive circuits provided in the first to ninth embodiments, which will not be repeated here.

In application, the display device may include, but not limited to, a display panel, a control unit, a source driver, a gate driver, and a drive circuit for controlling a power supply. Those skilled in the art can understand that FIG. 11 is only an example of a display device, and does not constitute a limitation to the display device. The display device may include more or less components than shown in the figure, or combine certain components, or different components, for example, input and output devices, network access devices, and the like can be included.

The aforementioned embodiments are only preferred embodiments of the present application, and are not intended to limit the present application. Although the present application has been described in detail with reference to the aforementioned embodiments, those skilled in the art should understand that modifications may be made on the technical solutions described in the above embodiments, or equivalent replacement may be made for some of the technical features, and such modification or replacement do not make the essence of the corresponding technical solutions deviate from the spirit and scope of the technical solutions of the various embodiments of the application, and should be included in the within the protection scope of the present application.

What is claimed is:

1. A drive circuit for a display panel, comprising: a generation module, a switch control module, and an output module; wherein the output module is in electric connection with the generation module and the switch control module respectively; the generation module is configured to receive a first clock signal, a second clock signal, a first control signal, and a second control signal, and process the first clock signal and the second clock signal according to the first control signal and the second control signal to obtain a generated signal, and output the generated signal to the output module, wherein the first clock signal and the second clock signal have a preset phase difference; the switch control module is configured to output a switch control signal to the output module according to received first level signal, second level signal, and third control signal; and the output module is configured to output, when the third control signal is at a low level, the generated signal to a gate driver according to the switch control signal; and the output module is further configured to output, when the third control signal is at a high level, the first clock signal or the second clock signal to the gate driver according to the switch control signal; the generation module comprises a first generation unit and a second generation unit; the first generation unit and the second generation unit are in electric connection with the output module, respectively; the first generation unit is configured to process the first clock signal within a first time period to obtain a first generated signal, and output the first generated signal to the output module; and the first generation unit is further configured to process the second clock signal within a second time period to obtain the first generated signal, and output the first generated signal to the output module; the second generation unit is configured to process the second clock signal within the first time period to obtain a second generated signal, and output the second generated signal to the output module; the second generation unit is further configured to process the first clock signal during the second time period to obtain the second generated signal, and output the second generated signal to the output module; and during the first time period, the first control signal is at a high level and the second control signal is at a low level, and during the second time period, the first control signal is at a low level and the second control signal is at a high level; the switch control module comprises a first switch unit and a second switch unit; the first switch unit is in electric connection with the second switch unit and the output module, respectively; and the second switch unit is in electric connection with the output module; the first switch unit is configured to receive a first level signal, and output, when the third control signal is at the low level, a first switch control signal to the output module, wherein, the first switch control signal is at a high level; and the second switch unit is configured to receive the second level signal and the third control signal, and output, when the third control signal is at the high level, a second switch control signal to the output module, wherein, the second switch control signal is at a high level.

2. The drive circuit of claim 1, wherein the first generation unit comprises a first electronic switch and a second electronic switch;

a drain of the first electronic switch is in electric connection with a drain of the second electronic switch, a source of the first electronic switch is configured to receive the first clock signal, and a gate of the first electronic switch is configured to receive the first control signal, and the drain of the first electronic switch is configured to output the first clock signal to the output module within the first time period; and a source of the second electronic switch is configured to receive the second clock signal, a gate of the second electronic switch is configured to receive the second control signal, and the drain of the second electronic switch is configured to output the second clock signal to the output module within the second time period.

3. The drive circuit of claim 1, wherein the second generation unit comprises a third electronic switch and a fourth electronic switch;

a drain of the third electronic switch is in electric connection with a drain of the fourth electronic switch, a source of the third electronic switch is configured to receive the second clock signal, a gate of the third electronic switch is configured to receive the first control signal, and the drain of the third electronic switch is configured to output the second clock signal to the output module within the first time period; and a source of the fourth electronic switch is configured to receive the first clock signal, a gate of the fourth electronic switch is configured to receive the second control signal, and the drain of the fourth electronic switch is configured to output the first clock signal to the output module within the second time period.

4. The drive circuit of claim 1, wherein the output module comprises a first output unit and a second output unit;

the first output unit is in electric connection with the first generation unit and the switch control module, respectively, and the second output unit is in electric connection with the second generation unit and the switch control module, respectively;

the first output unit is configured to: receive, when the third control signal is at the low level, the first generated signal and output the first generated signal to the gate driver; and is further configured to: receive, when the third control signal is at the high level, the first clock signal and output the first clock signal to the gate driver; and the second output unit is configured to: receive, when the third control signal is at the low level, the second generated signal and output the second generated signal to the gate driver; and is further configured to: receive, when the third control signal is at the high level, the second clock signal and output the second clock signal to the gate driver.

5. The drive circuit of claim 4, wherein the first output unit comprises a fifth electronic switch and a sixth electronic switch;

a drain of the fifth electronic switch is in electric connection with a drain of the sixth electronic switch, a source of the fifth electronic switch is configured to receive the first clock signal, a gate of the fifth electronic switch is configured to receive the second switch control signal, and the drain of the fifth electronic switch is configured to output the first clock signal to the gate driver when the third control signal is at the high level; and a source of the sixth electronic switch is configured to receive the first generated signal, a gate of the sixth electronic switch is configured to receive the first switch control signal, and the drain of the sixth electronic switch is configured to output the first generated signal to the gate driver when the third control signal is at the low level.

6. The drive circuit of claim 4, wherein the second output unit comprises a seventh electronic switch and an eighth electronic switch;

a drain of the seventh electronic switch is in electric connection with a drain of the eighth electronic switch, a source of the seventh electronic switch is configured to receive the second clock signal, a gate of the seventh electronic switch is configured to receive the second switch control signal, and the drain of the seventh electronic switch is configured to output the second clock signal to the gate driver when the third control signal is at the high level; and a source of the eighth electronic switch is configured to receive the second generated signal, a gate of the eighth electronic switch is configured to receive the first switch control signal, and the drain of the eighth electronic switch is configured to output the second generated signal to the gate driver when the third control signal is at the low level.

7. The drive circuit of claim 4, wherein the first switch unit is in electric connection with the second switch unit, the first output unit, and the second output unit, respectively, and the second switch unit is in electric connection with the first output unit and the second output unit, respectively; the first switch unit is configured to receive the first level signal, and output, when the third control signal is at the low level, a first switch control signal to the first output unit and the second output unit, wherein the first switch control signal is at a high level; and the second switch unit is configured to receive the second level signal and the third control signal, and output, when the third control signal is at the high level, a second switch control signal to the first output unit and the second output unit, wherein, the second switch control signal is at a high level.

8. The drive circuit of claim 7, wherein the first switch unit comprises a ninth electronic switch, and the second switch unit comprises a tenth electronic switch;

a source and a gate of the ninth electronic switch are configured to receive the first level signal, and a drain of the ninth electronic switch is configured to output, when the third control signal is at the low level, the first switch control signal to a sixth electronic switch of the first output unit and an eighth electronic switch of the second output unit; and a source of the tenth electronic switch is in connection with a second level signal end, a gate of the tenth electronic switch is configured to receive a third control signal, when the third control signal is at the high level, a gate of the tenth electronic switch is at a high level, the tenth electronic switch is turned on, the source of the tenth electronic switch is at a low level, such that a voltage at the drain of the ninth electronic switch and a voltage at the drain of the tenth electronic switch are neutralized to a low level, a sixth electronic switch of a first output unit and an eighth electronic switch of a second output unit are turned off, the second switch control signal is output to a fifth electronic switch of the first output unit and a seventh electronic switch of the second output unit, and the fifth electronic switch and the seventh electronic switch are turned on.

9. The drive circuit of claim 1, wherein the switch control module is configured to obtain a display state of the display panel, and adjust a level of the third control signal according to the display state of the display panel.

10. The drive circuit of claim 9, wherein the switch control module is configured to:

control the third control signal to switch to the high level, when a display screen refresh rate of the display panel is lower than a preset threshold; and control the third control signal to switch to the low level, when the display screen refresh rate of the display panel is higher than the preset threshold.

11. The drive circuit of claim 1, wherein the preset phase difference range between 0° and 180°.

12. The drive circuit of claim 1, wherein the phase difference between the first control signal and the second control signal is 90°.

13. The drive circuit of claim 1, wherein the first level signal is a high level signal, the second level is a low level signal, and the third control signal is a pulse signal having an adjustable level.

14. A display device, comprising: a display panel, a control unit, a source driver, and a gate driver;

wherein the display panel is in connection with the source driver and the gate driver, respectively, and the control unit is in connection with the source driver and the gate driver, respectively;

the control unit comprises the drive circuit according to claim 1; and the drive circuit of the control unit is in connection with the gate driver.

* * * * *